Aug. 29, 1939. A. T. POTTER 2,171,191
WINDSHIELD FRAME STRUCTURE
Filed March 11, 1938
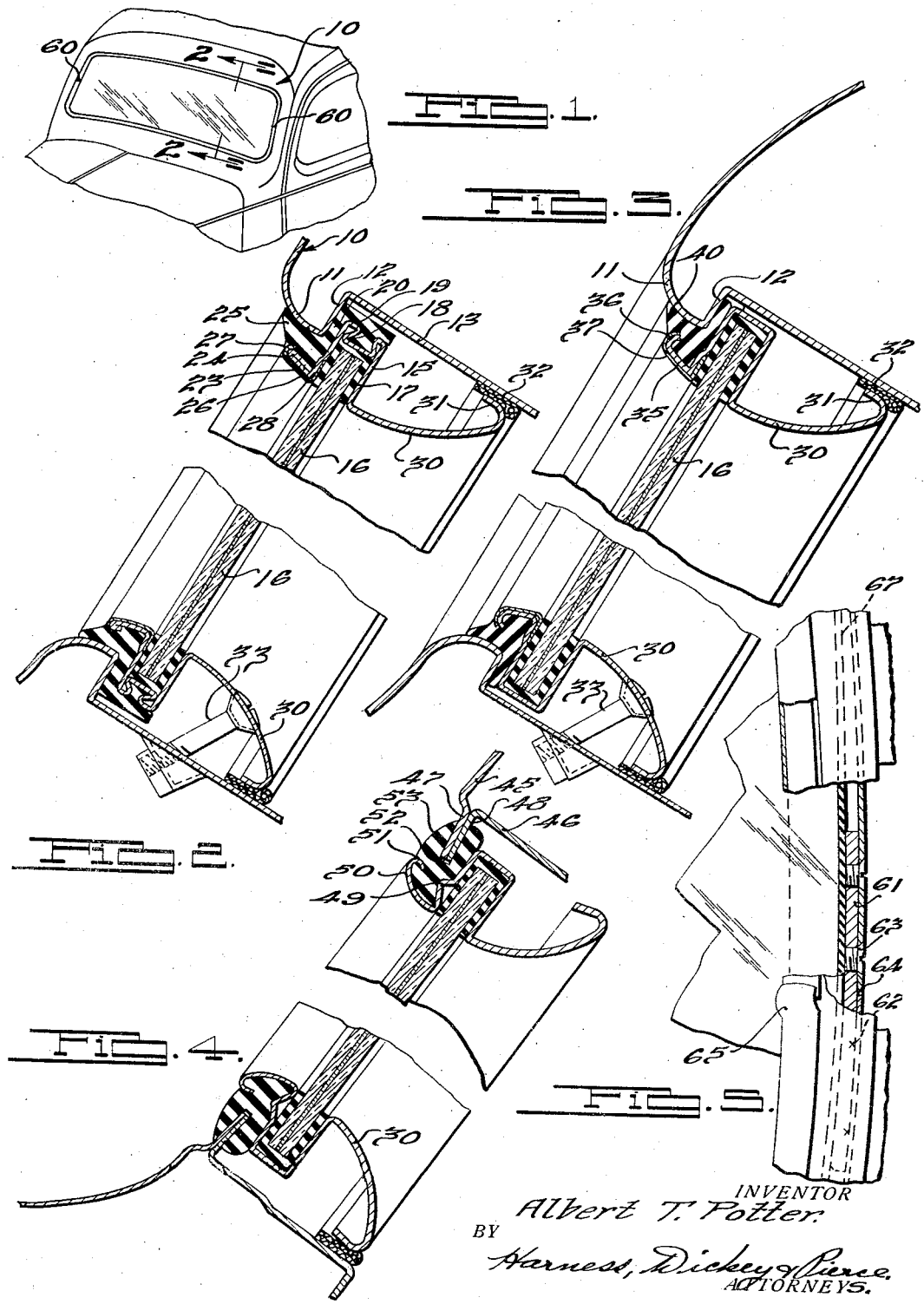
INVENTOR
Albert T. Potter.
BY
Harness, Dickey & Pierce.
ATTORNEYS.

Patented Aug. 29, 1939

2,171,191

UNITED STATES PATENT OFFICE

2,171,191

WINDSHIELD FRAME STRUCTURE

Albert T. Potter, Detroit, Mich., assignor to Ainsworth Manufacturing Company, Detroit, Mich., a corporation of Michigan Application March 11, 1938, Serial No. 195,357

17 Claims. (Cl. 296—84)

The invention relates generally to motor vehicles and it has particular relation to windshields.

In connection with windshields for motor vehicles, there are at least two important factors which must be considered. The first of these is that the windshield in use must be tightly sealed so as to prevent air and water from entering the vehicle when the latter is being used and the second is that the cost of manufacturing and installing these windshields must be reduced to a low figure. With this in mind, it may be said that the present invention has for its principal and general object to provide a windshield structure and arrangement which may be manufactured and installed inexpensively and which at the same time provides a tight seal around the edge of the windshield so as to prevent water and air from entering the vehicle around the edge of the windshield.

A more particular object of the invention is to provide a windshield structure which may be installed with a minimum of difficulty to the end that the invention may be readily employed by automobile manufacturers without undesirable interference with volume production methods.

Another particular object of the invention is to provide a windshield structure wherein the seal obtained around the edge of the glass will be maintained for a long period of time to the end that ordinarily the user of the vehicle will experience no leakage during the normal life of the vehicle.

Other objects of the invention will become apparent from the description, the drawing to which the description relates, and from the claims hereinafter set forth.

For a better understanding of the invention, reference may be had to the accompanying drawing wherein:

Figure 1 is a fragmentary view in perspective of a motor vehicle having a windshield constructed according to one form of the invention;

Fig. 2 is a cross-sectional view on a larger scale taken substantially on the line 2—2 of Fig. 1;

Fig. 3 is a similar cross-sectional view showing another form of the invention;

Fig. 4 is a similar cross-sectional view showing another form of the invention, and also showing a variation in the construction of the vehicle body with which the windshield is associated; and Fig. 5 is a detail view, partly in cross section, illustrating a joint in the windshield frame.

Referring to Fig. 1, which illustrates a part of the vehicle, it will be understood that the windshield is mounted at the front and that ordinarily the opening for the shield will be formed in what might be called a front body panel, indicated at 10. As shown by Fig. 2, the panel 10 is turned rearwardly around the edge of the opening, as indicated at 11, and then turned outwardly, to provide a shoulder 12 and then is directed rearwardly to provide a base surface 13. This arrangement provides the general opening for the windshield that normally is to be inserted as a separate assembly.

Still referring to Fig. 2, the windshield frame comprises a frame member having a channel portion 15 for receiving the edge of a glass 16 and normally a channel-shaped sealing strip 17 will be provided within the channel for receiving the edge of the glass so as to prevent leakage of water through the channel. The base portion of the channel 15 is provided with an opening 18 having a restricted entry and this opening serves as a means for retaining a rubber strip 19 having a portion disposed in the opening. The rubber strips extend around the base of the channel and inwardly along the front leg thereof, as indicated at 20, and the dimensions of the shoulder 12 and of the channel are such that the portion 20 of the rubber strip is disposed between a substantial portion of the shoulder and the front leg of the channel. At its free edge, the front leg of the channel is provided with a frontwardly and outwardly projecting flange 23, which at its free edge is reversely folded, as indicated at 24. The rubber extends around the outer peripheral side of this flange and has a frontwardly projecting lip 25 adapted to have tight sealing contact with the panel portion 11. For the purpose of covering the flange 23 and providing a finish therefor, a thin strip 26 of stainless steel, or similar metal, is disposed over the inner peripheral surface of such flange in laminated relation thereto and this strip of stainless steel has a front edge 27 folded around the front edge 24 of the flange and a rear edge portion 28 projecting outwardly along the rear surface of the front leg of the channel. It will be noted that the edge portion of such leg of the channel is slightly offset from the remainder of the channel leg so as to provide a space for this outwardly directed portion 28 of the finish strip. It may be observed that the finish strip will be exposed to rain and other elements that ordinarily would injure the usual metals but by using stainless steel, for example, the finish along this outwardly directed flange 23 of the windshield frame is preserved. In this connection, it may be mentioned that ordinarily the windshield frame will be constructed of cheaper metals that are not so rust resistant, and it is apparent that the use of the stainless steel finish strip will enable using such cheaper metals without having the objectionable feature of a frontwardly projecting portion which would be subject to rust. Particularly it may be observed that the stainless steel finish strip will positively conceal any frontwardly disposed portion of the windshield so that any rusting that might occur would not be visible.

In constructing the rubber strip, its lip portion 25 is so arranged that in normal condition it will tend to flex outwardly so as to cause it to at all times resiliently contact with the panel portion 11. This being true, it becomes apparent that when the assembly is inserted into the windshield opening from the rear side thereof, the lip 25 must be flexed inwardly until it passes the shoulder 12 of the panel. It has been found that this can readily be done without difficulty and without interfering with volume production and it is highly desirable because it insures that the rubber lip 25 will at all times constantly press against the panel surface 11.

At the rear side of the windshield, the free edge of the rear leg of the channel is provided with a rearwardly and outwardly extending flange 30 that terminates in a reversely bent portion 31 adapted to be disposed adjacent the base portion 13 of the panel. Bead molding 32 is disposed between the base portion 13 of the panel and the edge 31 of the flange 30 so as to prevent squeaking and also to provide an additional leak preventing means in the event any water should reach the rear side of the shield. For holding the windshield frame in position and at the same time for drawing it frontwardly, screws 33 are provided that are inclined to the plane of the shield and it is apparent that when these screws are tightened, the windshield frame is drawn forwardly so as to compress the rubber between the shoulder 12 and the channel. It will be noted that the flange 30 is somewhat resilient in character so that when the screws are tightened, the flange will act as a spring for causing frontward pushing of the frame.

Referring to Fig. 3, the construction shown by this figure is generally similar to that shown by Fig. 2 excepting that instead of using the particular shape of flange 23 at the front side of the windshield frame, a flange 35 is employed which at its front edge is curled outwardly, as indicated at 36, to provide, in conjunction with the front channel leg, a deeper locking recess for the rubber. A finish strip 37 is applied to the flange 35 similarly to the manner in which the finish strip 26 is applied in Fig. 2. Likewise, in the construction shown in Fig. 3, the rubber has a forward lip 40 which tends to resiliently contact the portion 11 of the body panel and in inserting the frame, it is necessary to flex this lip inwardly until it passes the shoulder 12.

In the arrangement shown by Fig. 4, the body panel is indicated at 45 and a base member 46, separately of the body panel, is provided, and these two parts have portions 47 and 48 that are welded together and which jointly provide a shoulder. The windshield frame in this construction has a front channel leg provided with a frontwardly projecting bead 49 and this, in conjunction with a flange 50 having a curled edge 51, provides a means for locking the rubber strip in place. The rubber strip in this construction has a slit 52 adapted to receive the panel portions 47 and 48 and at the rear side of the slit, the rubber is disposed between the portion 48 and the channel while at the front side of the slit, a rubber lip 53 contacts the portion 47. The rubber strip in this case is so formed that the lip 53 normally tends to flex rearwardly and this causes it to positively and resiliently contact the portion 47. In this case, likewise, in assembling the parts, the lip 53 is flexed inwardly when the frame is inserted from the rear, until the lip passes the inner edges of the portions 47 and 48 and then the lip snaps against the front side of portion 47.

It may be noted that in structures such as shown, it will be desirable to have breaks in the frame, as indicated at 60 in Fig. 1, so that the glass may be inserted in one half section of the frame and then the other half section applied to the glass and then connected to the first section. As shown by Fig. 5, this is accomplished by providing a short bar insert 61 along the channel base and which extends across the break in the frame and welding this bar to one section as indicated at 62 and securing it by screws 63 to the other section. At the break line indicated at 64, the channel portions of the two sections merely abut, but the flanges on one section, such as the flanges 23 and 30 in Fig. 2, have slightly offset end portions, indicated at 65, which overlap the ends of the flanges on the other section so as to avoid an open crack in the exposed parts of the frame. Such offset end portions preferably are curved over the break line, as shown, and as distinguished from a straight overlap, as the free edge of such offset end is in this way turned against the surface on the other section. Moreover, such curved overlapping end portions may be so designed that in bringing the two sections together, it is necessary to outwardly spring such end portions a slight amount in order to permit it to pass over the end on the other section. This provides a slight resiliency which insures contact.

It may be noted that the edge of the glass is cut back along the region of the bar, as indicated at 67, to provide room for bar 61 in the channel.

It will be understood that the glass is inserted and the two sections of the frame brought together, following which the rubber strip in annular form is placed around the frame. Some stretching may be required to do this, and it will be understood that the rubber may be pushed or ironed into the retaining grooves or recesses therefor.

In connection with all of the structures illustrated and described, it will be apparent that the rubber is compressed between the shoulder and channel and that this compression is constant due to the resiliency of flange 30. This, in conjunction with the resiliency of the front lip of the rubber strip, insures constant rubber contact at the sealing points.

While more than one form of the invention has been described and illustrated in detail, it will be apparent to those skilled in the art that various modifications may be made without departing from the spirit and scope of the appended claims.

What is claimed is:

1. In combination, an automobile body panel having a windshield opening, means on the panel providing an inwardly directed shoulder at the front side of the opening, a windshield frame disposed in said opening and comprising a frame member having in transverse cross section a channel portion for receiving the edge of the windshield, a flange portion extending rearwardly from the edge of the rear leg of the channel, and a flange portion extending forwardly from the front leg of the channel, a rubber sealing strip extending around the second flange and disposed partly between the channel and shoulder, and means fastening the first flange to the panel.

2. In combination, an automobile body panel having a windshield opening, means on the panel providing an inwardly directed shoulder at the front side of the opening, a windshield frame disposed in said opening and comprising a frame member having in transverse cross section a channel portion for receiving the edge of the windshield, a flange portion extending rearwardly from the edge of the rear leg of the channel, and a flange portion extending forwardly from the front leg of the channel, a rubber sealing strip extending around the second flange and disposed partly between the channel and shoulder, and means fastening the first flange to the panel, and including screw means inclined to the plane of the windshield so that tightening of said means forces the frame frontwardly and the channel portion and rubber against the shoulder.

3. In combination, an automobile body panel having a windshield opening, means on the panel providing an inwardly directed shoulder at the front side of the opening, a windshield frame disposed in said opening and comprising a frame member having in transverse cross section a channel portion for receiving the edge of the windshield, a flange portion extending rearwardly from the edge of the rear leg of the channel, and a flange portion extending forwardly from the front leg of the channel, and terminating in a reversely turned lip, a rubber sealing strip extending around the second flange and retained thereon between the lip and front leg of the channel and disposed partly between the channel and shoulder and means fastening the first flange to the panel.

4. An article of manufacture comprising a windshield frame member having in transverse cross section a channel portion for receiving the edge of a glass shield and a flange projecting transversely to the plane of the frame from the free edge of that leg of the channel adapted to be disposed next to the front of the vehicle, and a rubber sealing element around the outer peripheral side of the flange and having a portion extending outwardly along the front channel leg.

5. An article of manufacture comprising a windshield frame member having in transverse cross section a channel portion for receiving the edge of a glass shield and a flange projecting transversely to the plane of the frame from the free edge of that leg of the channel adapted to be disposed next to the front of the vehicle and terminating in an outwardly bent lip, and a rubber sealing element around the outer peripheral side of the flange and having a portion extending outwardly along the front channel leg.

6. An article of manufacture comprising a windshield frame member having in transverse cross section a channel portion for receiving the edge of a glass shield, a flange projecting from the free edge of that leg of the channel adapted to be disposed next to the front of the vehicle, and a rubber sealing element around the outer peripheral side of the flange and having a portion extending outwardly along the front channel leg, said rubber sealing element having a slit adapted to receive a flange portion on the vehicle body around the windshield opening.

7. An article of fanufacture comprising a windshield frame member having in transverse cross section a channel portion for receiving the edge of a glass shield, a flange projecting from the free edge of that leg of the channel adapted to be disposed next to the front of the vehicle, and a rubber sealing element around the outer peripheral side of the flange and having a portion extending outwardly along the front channel leg, said rubber sealing element having a rabbeted corner portion adapted to receive a cornered portion extending around the windshield opening of the vehicle body.

8. A windshield frame as an article of manufacture comprising a frame member having in transverse cross section a channel portion for receiving the edge of a glass shield, a flange portion projecting from the free edge of that leg of the channel adapted to be disposed next to the front of the vehicle, a rubber sealing element extending around the outer peripheral side of the flange, and a thin metal finish strip covering the inner peripheral side of the flange.

9. A windshield frame as an article of manufacture comprising a frame member having in transverse cross section a channel portion for receiving the edge of a glass shield, a flange portion projecting from the free edge of that leg of the channel adapted to be disposed next to the front of the vehicle, a rubber sealing element extending around the outer peripheral side of the flange, and a thin metal finish strip covering the inner peripheral side of the flange, said finish strip having its outer side edge bent outwardly around the outer side edge of the flange and its inner side edge bent outwardly into the channel.

10. A windshield frame as an article of manufacture comprising a frame member having in transverse cross section a channel portion for receiving the edge of a glass shield and a flange portion projecting transversely to the plane of the frame from the free edge of that leg of the channel adapted to be disposed next to the front of the vehicle, and a rubber sealing element extending around the outer peripheral side of the flange and having a portion extending over the front side edge of the flange so as to conceal such edge.

11. In combination, a vehicle front body panel having a windshield opening defined by a base surface extending transversely to the plane of the opening and an inwardly directed shoulder portion defining a shoulder surface at the front edge of the opening, a windshield frame disposed in the opening and comprising a frame member having in a transverse cross section a channel for receiving the edge of a glass shield, a flange projecting from the free edge of the front leg of the channel and frontward past the inner edge of the shoulder, a rubber sealing strip around the outer side of the flange and extending frontwardly past the shoulder surface and also having a portion extending outwardly along the front channel leg and between it and the shoulder surface, a glass in the channel, and means for holding the frame in the opening and the rubber compressed between the shoulder surface and channel.

12. In combination, a vehicle front body panel having a windshield opening defined by a base surface extending transversely to the plane of the opening and an inwardly directed shoulder portion defining a shoulder surface at the front edge of the opening, a windshield frame disposed in the opening and comprising a frame member having in a transverse cross section a channel for receiving the edge of a glass shield, a flange projecting from the free edge of the front leg of the channel and frontward past the inner edge of the shoulder, a rubber sealing strip around the outer side of the flange and having a frontwardly projecting lip extending frontwardly and outwardly around the shoulder and in contact therewith and also having a portion disposed between the shoulder surface and the front leg of the channel, and means for holding the frame in the opening and the rubber compressed between the shoulder surface and channel.

13. In combination, a vehicle front body panel having a windshield opening defined by a base surface extending transversely to the plane of the opening and an inwardly directed shoulder portion defining a shoulder surface at the front edge of the opening, a windshield frame disposed in the opening and comprising a frame member having in a transverse cross section a channel for receiving the edge of a glass shield, a flange projecting from the free edge of the front leg of the channel and frontward past the inner edge of the shoulder, a rubber sealing strip around the outer side of the flange and having a frontwardly projecting lip extending frontwardly and outwardly around the shoulder and in contact therewith and also having a portion disposed between the shoulder surface and the front leg of the channel, and means for holding the frame in the opening and the rubber compressed between the shoulder surface and channel, said frontwardly and outwardly projecting lip on the rubber being in normal condition sprung outwardly in contact with the front side of the shoulder so that when the assembly is inserted from the rear side of the opening, the rubber lip must be flexed inwardly until it passes frontwardly over the shoulder.

14. In combination, a vehicle front body panel having a windshield opening defined by a base surface extending transversely to the plane of the opening and an inwardly directed shoulder portion defining a shoulder surface at the front edge of the opening, a windshield frame disposed in the opening and comprising a frame member having in a transverse cross section a channel for receiving the edge of a glass shield, a flange projecting from the free edge of the front leg of the channel and frontward past the inner edge of the shoulder, a rubber sealing strip around the outer side of the flange and extending frontwardly past the shoulder surface and also having a portion extending outwardly along the front channel leg and between it and the shoulder surface, a glass in the channel, and means for holding the frame in the opening and the rubber compressed between the shoulder surface and channel, said holding means comprising a flange projecting rearwardly and outwardly from the free edge of the rear channel leg and terminating adjacent the base surface of the opening, and screw means inclined to the plane of the opening for fastening the second flange to the panel and drawing the frame frontwardly.

15. In combination, a vehicle body having a windshield opening and an inwardly directed shoulder around the front side of the opening, a windshield in the opening, a rubber sealing element extending around the windshield between the front side of the latter and said shoulder and having a lip projecting frontwardly past the inner edge of said shoulder, a metal strip extending around the inner peripheral surface of said lip, and means holding the windshield in said opening.

16. In combination, a vehicle body having a windshield opening and an inwardly directed shoulder around the front side of the opening, a windshield in the opening, a rubber sealing element extending around the windshield between the front side of the latter and said shoulder and having a lip projecting frontwardly past the inner edge of said shoulder, a metal strip extending around the inner peripheral surface of said lip, and means holding the windshield in said opening, said metal strip being shaped to provide an outwardly open channel and said rubber lip having a portion fitting within said channel.

17. In combination, a vehicle body having a windshield opening and an inwardly directed flange around the front side of the opening, a windshield in the opening, a rubber sealing element extending around the windshield between the front side of the latter and the flange and having a lip portion extending frontwardly past the inner edge of said flange and then outwardly along the front side of such flange, a metal strip extending around the inner periphery of said lip, and means holding the windshield in said opening.

ALBERT T. POTTER.